(12) United States Patent
Carl et al.

(10) Patent No.: US 8,517,133 B2
(45) Date of Patent: Aug. 27, 2013

(54) SYSTEM INCLUDING OUTPUT COUPLED POWERSPLIT TRANSMISSION

(75) Inventors: Blake A. Carl, Richland, MI (US); Stephen Horsfall, Auckland (NZ); Joseph A. Kovach, Aurora, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 372 days.

(21) Appl. No.: 12/838,815

(22) Filed: Jul. 19, 2010

(65) Prior Publication Data

US 2011/0031053 A1 Feb. 10, 2011

Related U.S. Application Data

(60) Provisional application No. 61/226,331, filed on Jul. 17, 2009.

(51) Int. Cl.
*B60K 6/12* (2006.01)
*F16H 47/04* (2006.01)

(52) U.S. Cl.
USPC ............................. 180/165; 903/903; 475/72

(58) Field of Classification Search
USPC .................. 180/65.2, 65.3, 65.6, 65.7, 65.22, 180/165; 475/72, 5; 74/655; 903/923, 945, 903/903
See application file for complete search history.

(56) References Cited

U.S. PATENT DOCUMENTS

2006/0145482 A1\* 7/2006 Roethler et al. ............ 290/40 C
2008/0081724 A1 4/2008 Ivantysynova et al.

OTHER PUBLICATIONS

Bowns et al. "Design Study of a Regenerative Hydrostatic Split Power Transmission for a City Bus," IMechE, 1981.

\* cited by examiner

*Primary Examiner* — John Walters
*Assistant Examiner* — James Triggs
(74) *Attorney, Agent, or Firm* — Renner, Otto, Boisselle & Sklar, LLP

(57) ABSTRACT

A powersplit transmission having a compact configuration that readily can be incorporated in a vehicle, particularly within the vehicle frame, includes (a) a mechanical transmission having a rotatable input shaft, a rotatable output shaft, and multiple gears for mechanically transmitting power between the input shaft and the output shaft; and (b) a hydraulic transmission containing a fluid for transmitting power between the input shaft and the output shaft. The mechanical transmission has a housing from which the input shaft and the output shaft extend. The hydraulic transmission includes first and second hydraulic units, each of which can function as a pump or a motor. The first hydraulic unit is coupled to the mechanical transmission system and the second hydraulic unit is coupled to the output shaft. The first and second hydraulic units are offset to the same side of the input shaft and the output shaft.

13 Claims, 10 Drawing Sheets

SYSTEM INCLUDING OUTPUT COUPLED POWERSPLIT TRANSMISSION

RELATED APPLICATIONS

This application claims the benefit of U.S. Provisional Application No. 61/226,331 filed Jul. 17, 2009, which is hereby incorporated herein by reference.

FIELD OF THE INVENTION

This invention relates generally to a power transmission system, and more particularly to a system having an output coupled hydraulic powersplit transmission.

BACKGROUND OF THE INVENTION

A transmission typically converts speed input from a power source, such as an internal combustion engine, and outputs a different speed to another device, such as drive wheels. A powersplit transmission can enhance the output or store input energy for later output. Such devices often can be used to capture energy from braking the drive wheels, thereby further increasing efficiency. The powersplit transmission can include both mechanical and hydraulic components.

SUMMARY OF THE INVENTION

A powersplit transmission includes more components, and often more complex components, than a standard mechanical transmission. The present invention provides a powersplit transmission having a compact configuration that readily can be incorporated in a vehicle, particularly within the vehicle frame.

More particularly, the present invention provides a powersplit transmission that includes (a) a mechanical transmission having a rotatable input shaft, a rotatable output shaft, and multiple gears for mechanically transmitting power between the input shaft and the output shaft; and (b) a hydraulic transmission containing a fluid for transmitting power between the input shaft and the output shaft. The mechanical transmission has a housing from which the input shaft and the output shaft extend. The hydraulic transmission includes first and second hydraulic units, each of which can function as a pump or a motor. The first hydraulic unit is coupled to the mechanical transmission system and the second hydraulic unit is coupled to the output shaft. The first and second hydraulic units are offset to the same side of the input shaft and the output shaft.

According to one or more embodiments of the invention, the powersplit transmission includes one or more of the following features: (a) the mechanical transmission includes a planetary gear train having a sun gear, a ring gear, a plurality of planet gears, and a carrier associated with the planet gear, such that the input shaft is operatively connected to the carrier for inputting motion to the planet gears, and the output shaft is operatively connected to the ring gear, the first hydraulic unit is operatively connected to the sun gear of the planetary gear train and the second hydraulic unit is operatively connected to the output shaft; (b) the output shaft is coaxial with the input shaft; (c) the first and second hydraulic units are located on opposite sides of the housing; (d) the first and second hydraulic units each have associated shafts, and the first and second hydraulic units are mounted on the housing such that the shafts are coaxial with one another; (e) the first and second hydraulic units each have associated shafts, and the first and second hydraulic units are mounted on the housing such that the shafts are parallel to one another but offset relative to a centerline of the input and output shafts; (f) the powersplit transmission further includes a parking pawl that is configured to engage at least one gear to prevent rotation of the at least one gear and, thus, rotation of the output shaft; (g) the powersplit transmission further includes a forced lubrication pump for drawing fluid from the housing and proving the fluid to bearings in the housing, where the forced lubrication pump is driven by one of the input and output shafts; (h) the powersplit transmission further includes a cooling pump for drawing fluid from the housing and providing the fluid to a heat exchanger, and the cooling pump is driven by a common shaft as the forced lubrication pump; and (i) the powersplit transmission further includes a multiple speed gearbox attached to the output shaft.

The present invention also provides a system for a vehicle having the powersplit transmission described above, as well as a high pressure accumulator in fluid communication with the first and second hydraulic units. In a first mode of operation the second hydraulic unit receives fluid from the accumulator and operates as a motor to output power for propelling the vehicle, and in a second mode of operation the second hydraulic unit operates as a pump to pump fluid to the accumulator.

In one or more embodiments the vehicle further includes a power source coupled to the input shaft to drive rotation of the input shaft and deliver power to the powersplit transmission, and a power consumer coupled to the output shaft to receive power from the powersplit transmission. In addition or in the alternative, one or more embodiments of the vehicle include a frame and the powersplit transmission is sized to fit within the frame.

Further features of the invention will become apparent from the following detailed description when considered in conjunction with the drawings.

DETAILED DESCRIPTION

The present invention provides a powersplit transmission having a compact configuration that readily can be incorporated in a vehicle, particularly within a vehicle frame.

Figure 1:
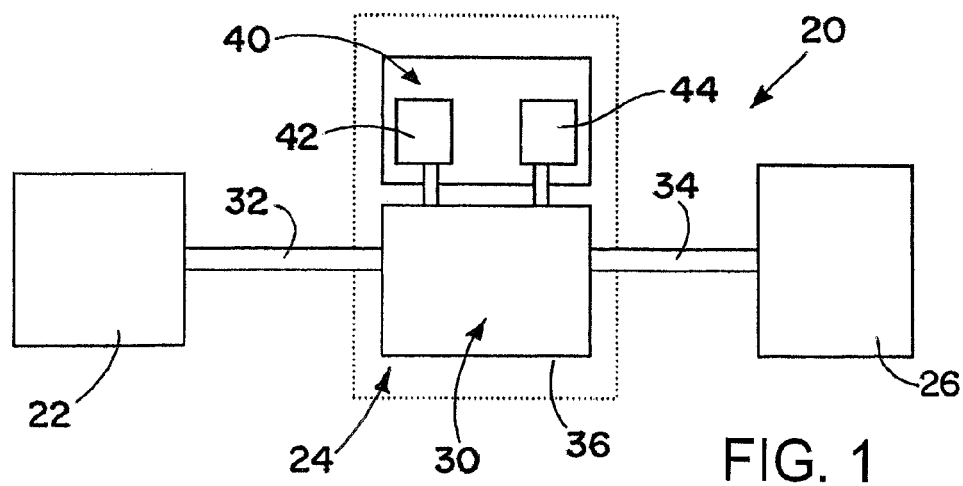
FIG. 1 is a schematic representation of a system with a powersplit transmission provided in accordance with the present invention.

Turning now to a detailed description of the invention with reference to the accompanying drawings, FIG. 1 schematically illustrates a generic drive system 20 for a vehicle with a power source 22, which is connected to a powersplit transmission 24, and a power consumer 26 connected to the powersplit transmission 24. In some situations the power consumer 26 can provide power back to the powersplit transmission 24. The powersplit transmission 24 includes a mechanical transmission 30 having a rotatable input shaft 32 coupled to the power source 22 and a rotatable output shaft 34 coupled to the power consumer 26 for mechanically transmitting power between the input shaft 32 and the output shaft 34. The mechanical transmission 30 has a housing 36 from which the input shaft 32 and the output shaft 34 extend to the power source 22 and the power consumer 26, respectively. The powersplit transmission 24 also includes a hydraulic transmission 40 containing a fluid for transmitting power between the input shaft 32 and the output shaft 34 as an alternative or complement to the mechanical transmission 30. The hydraulic transmission 40 includes first and second hydraulic units 42 and 44, the first hydraulic unit 42 being coupled to the mechanical transmission 30 and the second unit 44 being coupled to the output shaft 34 via the mechanical transmission 30. The first and second hydraulic units 42 and 44 are offset to the same side of the input shaft 32 and the output shaft 34, thereby providing a powersplit transmission 24 in a compact package for installation in a vehicle.

Figure 2:
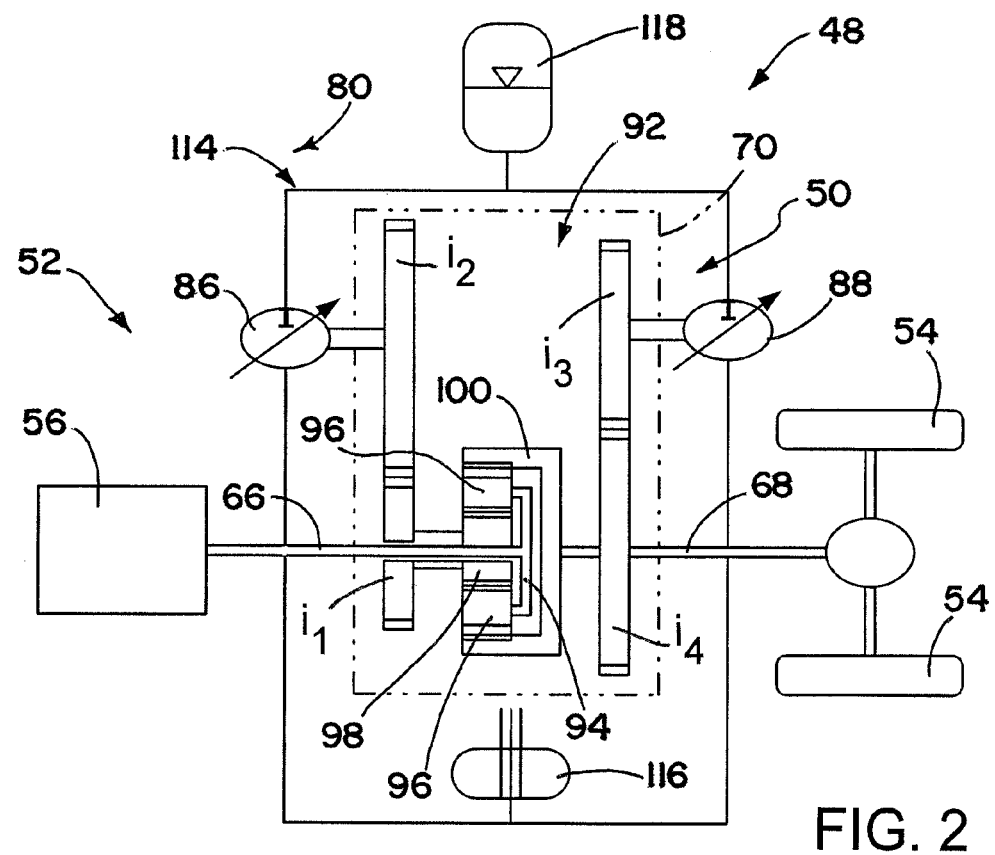
FIG. 2 is a more-detailed schematic of an exemplary system with a powersplit transmission provided in accordance with the present invention.

FIG. 2 schematically illustrates such a system 48 with a powersplit transmission 50 constructed in accordance with the present invention. As will be described in detail below, the system 48 includes the powersplit transmission 50, which is incorporated in a vehicle 52 having a power consumer in the form of driven wheels 54 and a power source 56 for powering movement of the vehicle. The power source 56, such as an internal combustion engine, inputs power into the powersplit transmission 50, and the power consumer, such as the driven wheels 54, receives power from the powersplit transmission 50. In some cases, the power consumer also can input power into the powersplit transmission 50, such as, for example, when adapted to recover braking energy.

The powersplit transmission 50 includes a mechanical transmission 60 with a rotatable input shaft 66 coupled to the power source 56 and a rotatable output shaft 68 coupled to the power consumer 54. The mechanical transmission 60 has a housing 70 from which the input shaft 66 and the output shaft 68 extend to the power source 56 and the power consumer 54, respectively. The powersplit transmission 50 also includes a hydraulic transmission 80 with first and second hydraulic units 86 and 88.

In the illustrated embodiment, the mechanical transmission 60 includes a planetary gear train 92, a number of spur gears, labeled i1, i2, i3, and i4. The planetary gear train 92 includes a carrier 94 that supports a plurality of planet gears 96. The planet gears 96 are rotatable about an internal sun gear 98 and inside an external ring gear 100. In the powersplit transmission 50 illustrated in FIG. 2, the carrier 94 is attached to the input shaft 66. The input shaft 66 may be the output shaft of the internal combustion engine 56 or may be a separate shaft coupled to the output shaft of the internal combustion engine, or other power source. The sun gear 98 of the planetary gear train 92 is attached via a gear ratio (determined by spur gears i1 and i2) to the first hydraulic unit 86. The ring gear 100 of the planetary gear train 92 is attached via another gear ratio (determined by spur gears i3 and i4) to the second hydraulic unit 88 and to the output shaft 68 of the powersplit transmission 50. In FIG. 2, the output shaft 68 of the powersplit transmission 50 is the drive shaft of the vehicle 52. The output shaft 68 may be a separate shaft, however, coupled to the drive shaft of the vehicle. The input shaft 66 and the output shaft 68 of the powersplit transmission 50 are shown as being coaxial, but in other embodiments the input shaft 66 and the output shaft 68 are not coaxial but offset from one another.

The hydraulic transmission 80 includes the first and second hydraulic units 86 and 88, and a hydraulic circuit 114 associated with the first and second hydraulic units 86 and 88. The hydraulic circuit further includes a reservoir 116 and an accumulator 118. A controller (not shown) controls the displacement of the first and second hydraulic units 86 and 88. The controller also may control the power source 56. Power input into the powersplit transmission 50 can be transferred to the power consumer 54 either mechanically through the planetary gear train 92 or hydraulically by the first and second hydraulic units 86 and 88 and the hydraulic circuit 114. Hydraulic power also can be stored in the accumulator 118 for later use in powering the power consumer 54 via the second hydraulic unit 88.

In the illustrated hydraulic transmission 80, the second hydraulic unit 88 is coupled to the output shaft 68 via the planetary gear train 92, as described above. The illustrated first and second hydraulic units 86 and 88 are variable pump/motors. Thus, each of the first and second hydraulic units 86 and 88 may be operated as a pump and as a motor, in different situations. In one exemplary embodiment, the first and second hydraulic units 86 and 88 are bent axis units with yoke assemblies that may be moved over-center for changing the operation of the unit between that of a pump and that of a motor. As a result, when the powersplit transmission 50 is incorporated into a vehicle 52, for example, dynamic braking energy of the vehicle may be recovered by the second hydraulic unit 88 acting as a pump to provide fluid to the high pressure accumulator 118.

Figure 3:
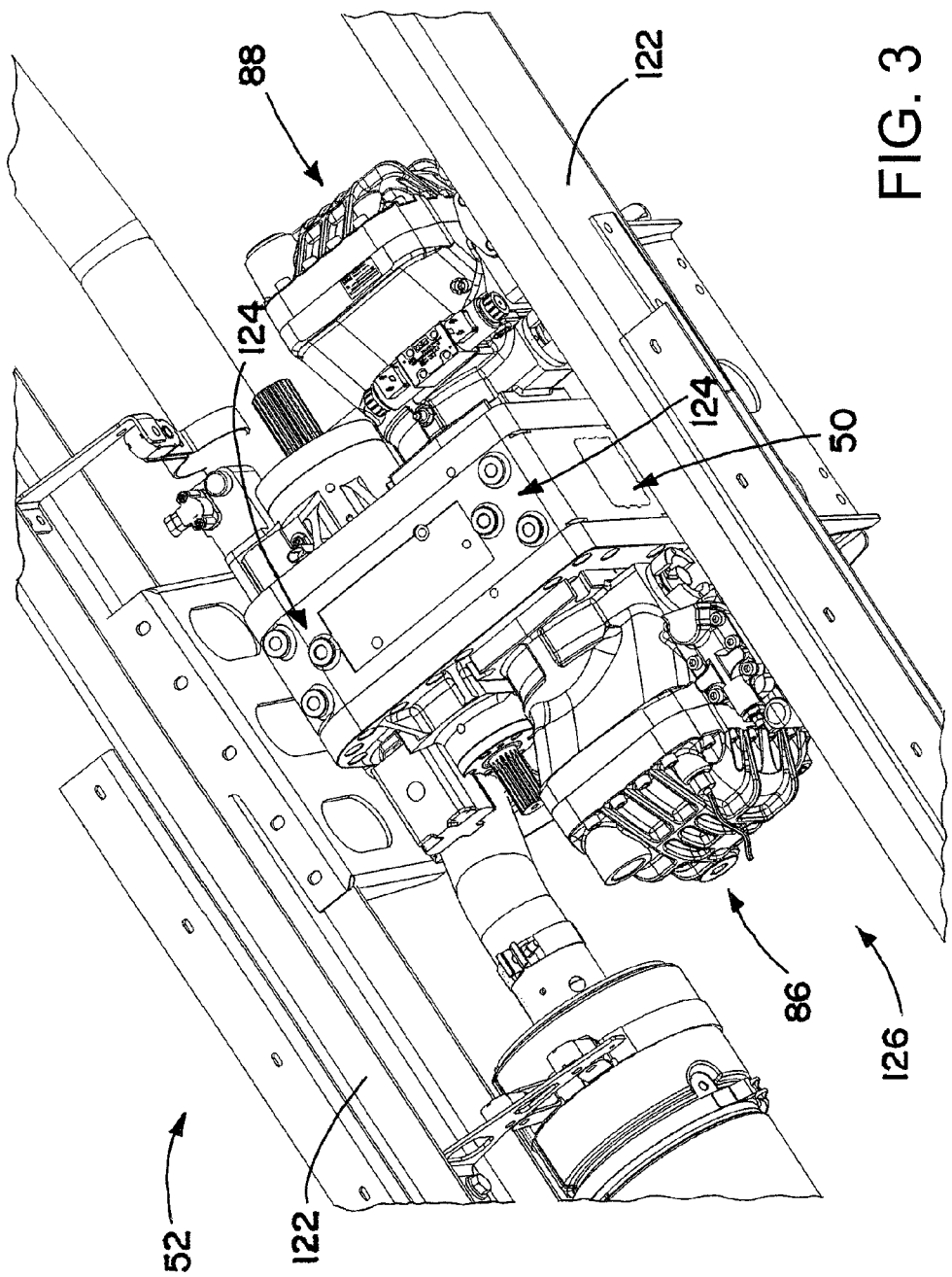
FIG. 3 is a perspective view of an exemplary system with a powersplit transmission corresponding to FIG. 2, shown between parallel rails of a vehicle frame.

FIG. 3 illustrates an exemplary embodiment of the powersplit transmission 50 mounted between frame rails 122 of a vehicle. Mounting members 124 on the housing 70 of the powersplit transmission 50 enable mounting the powersplit transmission 50 to the vehicle. The mounting members 124 are such that the powersplit transmission 50 is mounted to a cross-member (not shown) that extends between and is supported by the frame rails 122. Alternatively, the powersplit transmission 50 may include mounting members for enabling the powersplit transmission to be mounted directly to the frame rails 122. When mounted between the frame rails 122 of the vehicle, as illustrated in FIG. 3, the first hydraulic unit 86 which acts as a pump when power is being transmitted to the drive wheels is located nearest the engine of the vehicle on an input shaft side 126 of the powersplit transmission 50.

Figure 4:
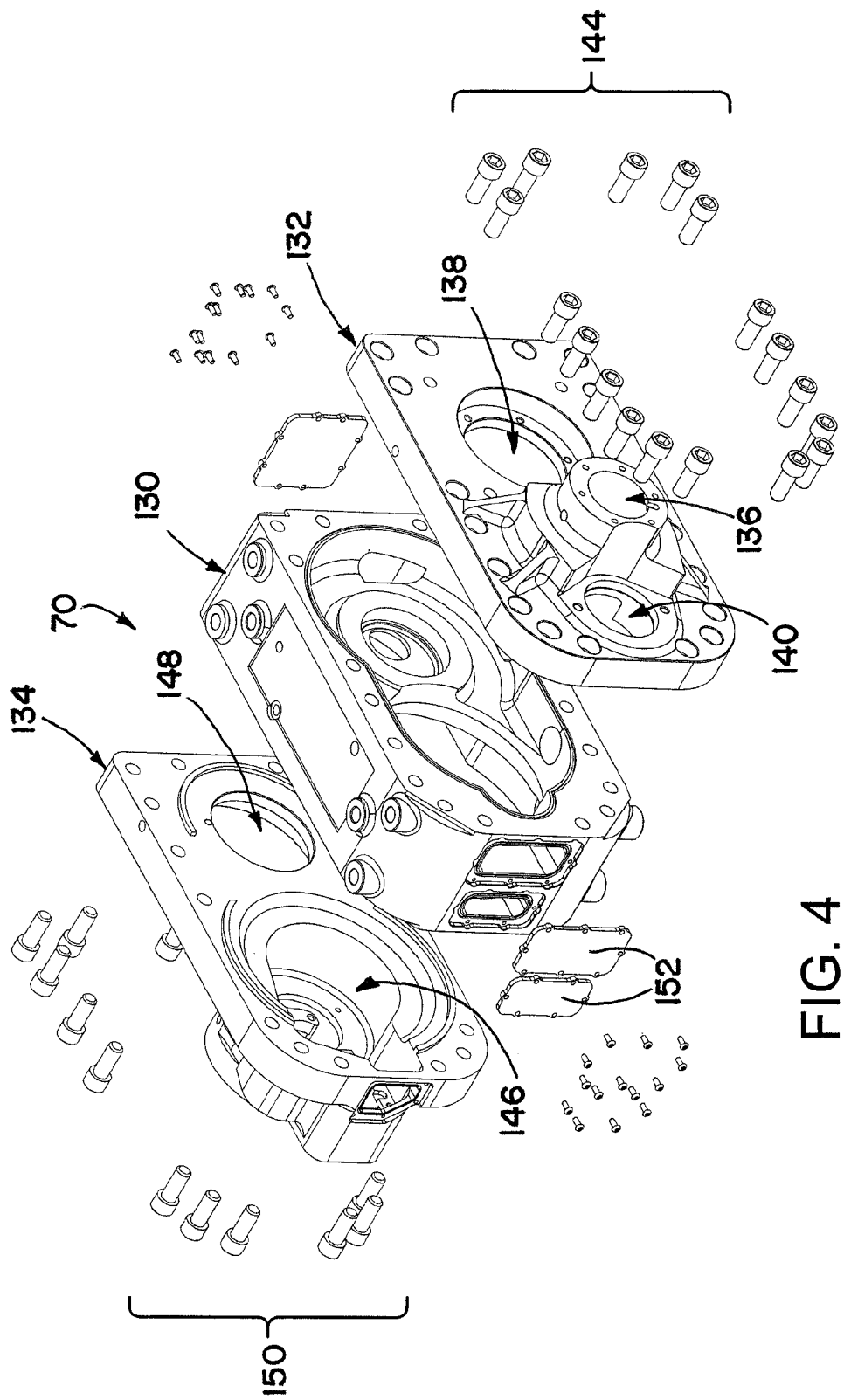
FIG. 4 is an end view of a portion of the powersplit transmission shown with the system of FIG. 3.

FIG. 4 shows an exploded perspective view of an exemplary main housing 70. In this embodiment, the main housing 70 includes a central portion 130, a first end portion 132 and a second end portion 134 on opposing sides of the central portion 130. The central portion 130 includes an internal cavity for receiving the planetary gear train 92 (FIG. 2) along with the components for enabling rotation and sealing. The first end portion 132 of the main housing 70 includes an opening 136 for receiving the input shaft 66 (FIG. 2) and the opening 138 for receiving the first hydraulic unit 86 (FIG. 2). Also, illustrated on the first end portion 132 of the main housing 70 is a third opening 140 for receiving the forced lubrication pump 142 (FIG. 2). The first end portion 132 of the main housing 70 is attached to the central portion 150 by a plurality of fasteners 144 that extend through holes on the first end portion 132 and thread into holes in the central portion 130 of the main housing 70. The second end portion 134 of the main housing 70 includes an opening 146 for the output shaft 68 (FIG. 2) along with an opening 148 for receiving the second hydraulic unit 88 (FIG. 2). The second end portion 134 of the main housing 70 is attachable to the central portion 130 by a plurality of fasteners 150 that extend through holes in the second end portion 134 and are received in threaded holes in the central portion 130. As illustrated in FIG. 4, the central portion 130 of the main housing 70 also includes access panels 152 that are removable for enabling access into the cavities of the central portion 130. These access panels 152 simplify inspection of the planetary gear train 92 (FIG. 2).

Figure 5:
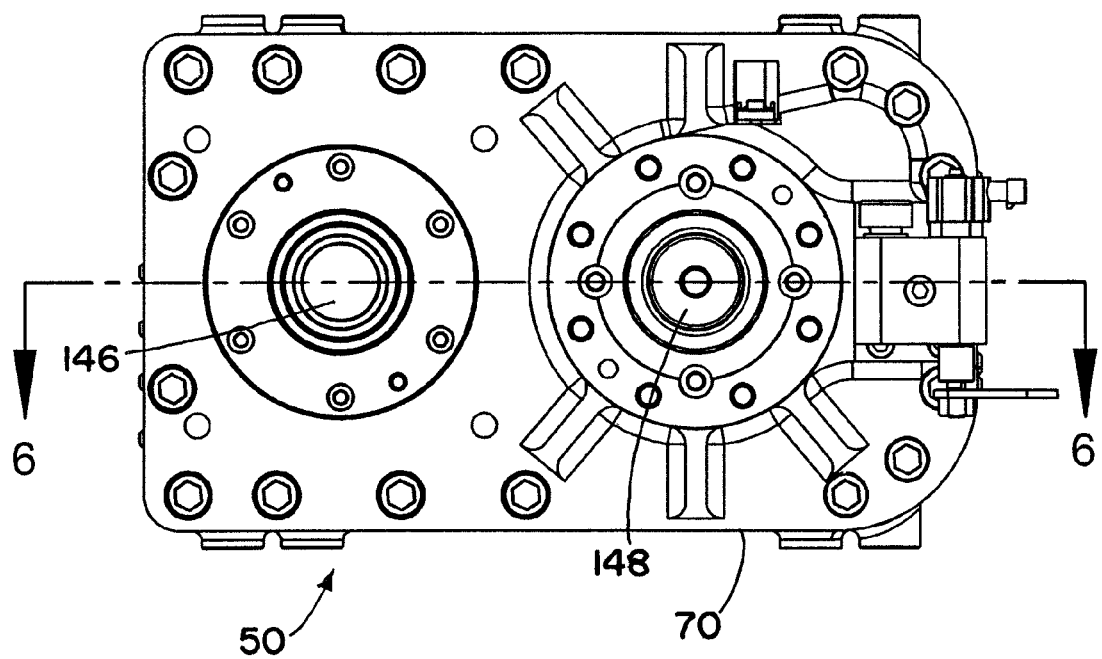
FIG. 5 is a cross-sectional view of the portion of the powersplit transmission shown in FIG. 4, as seen along lines 5-5 of FIG. 4.
Figure 6:
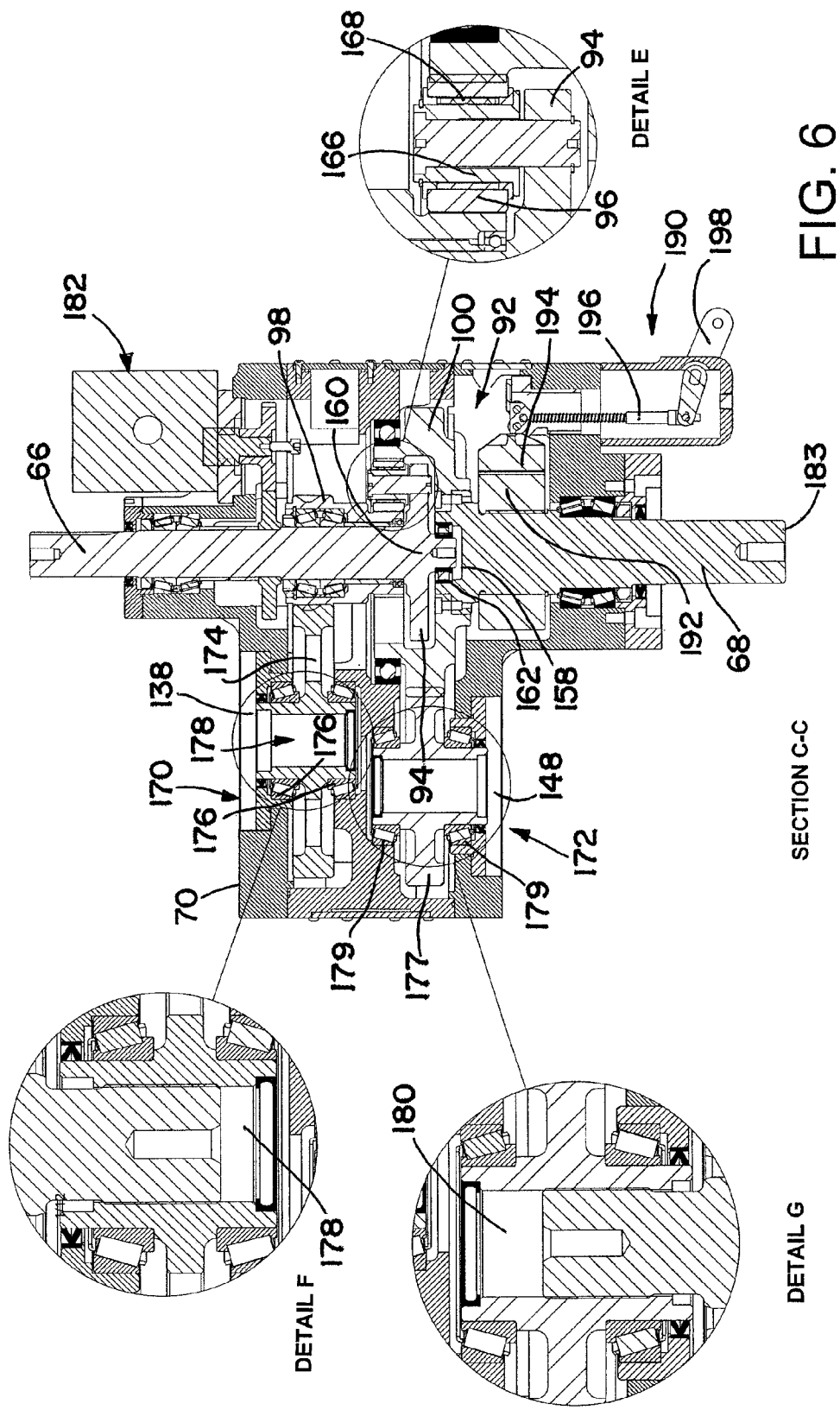
FIG. 6 is a cross-sectional view of the powersplit transmission shown in FIG. 3, as seen along the same sectional lines as FIG. 5.

The main housing 70 for the mechanical transmission 60 is shown in FIG. 5, for purposes of showing the section line 6-6 for FIG. 6. FIG. 6 illustrates a cut-away or sectional view of an exemplary powersplit transmission 50 provided by the present invention, and more particularly the mechanical transmission 60 of the powersplit transmission 50.

In the embodiment of FIG. 6, a first end 158 of the output shaft 68 includes a central recess for receiving a boss portion located on a second end 160 of the input shaft 66, just beyond the carrier 94. A bearing 162 is interposed between the boss portion of the input shaft 66 and the output shaft 68 for enabling relative movement between the input shaft 66 and the output shaft 68.

The carrier 94, which is located on the second end 160 of the input shaft 66, supports a plurality of flex pins 166, one of which is illustrated in detail E in FIG. 6. The flex pins 166 each include an end that is fixed relative to the carrier 94 and a cantilevered end. The flex pins 166 support the planet gears 96 of the planetary gear train 92. The cantilevered end of the flex pin 166 is free to move relative to the carrier 94. The flex pin 166 supports a bobbin 168 upon which the planet gear 96 may rotate.

With reference again to FIG. 6, the main housing 70 defines a hydraulic pump receiving section 170 and a hydraulic motor receiving section 172. The hydraulic pump receiving section 170 is located on a side of the main housing 70 nearest the input shaft 66, while the hydraulic motor receiving section 172 is located on a side of the main housing 70 nearest the output shaft 68. The hydraulic pump receiving section 170 and the hydraulic motor receiving section 172 are located axially adjacent to one another along and radially offset from a centerline defined by the center of the input and output shafts 66 and 68.

Figure 7:
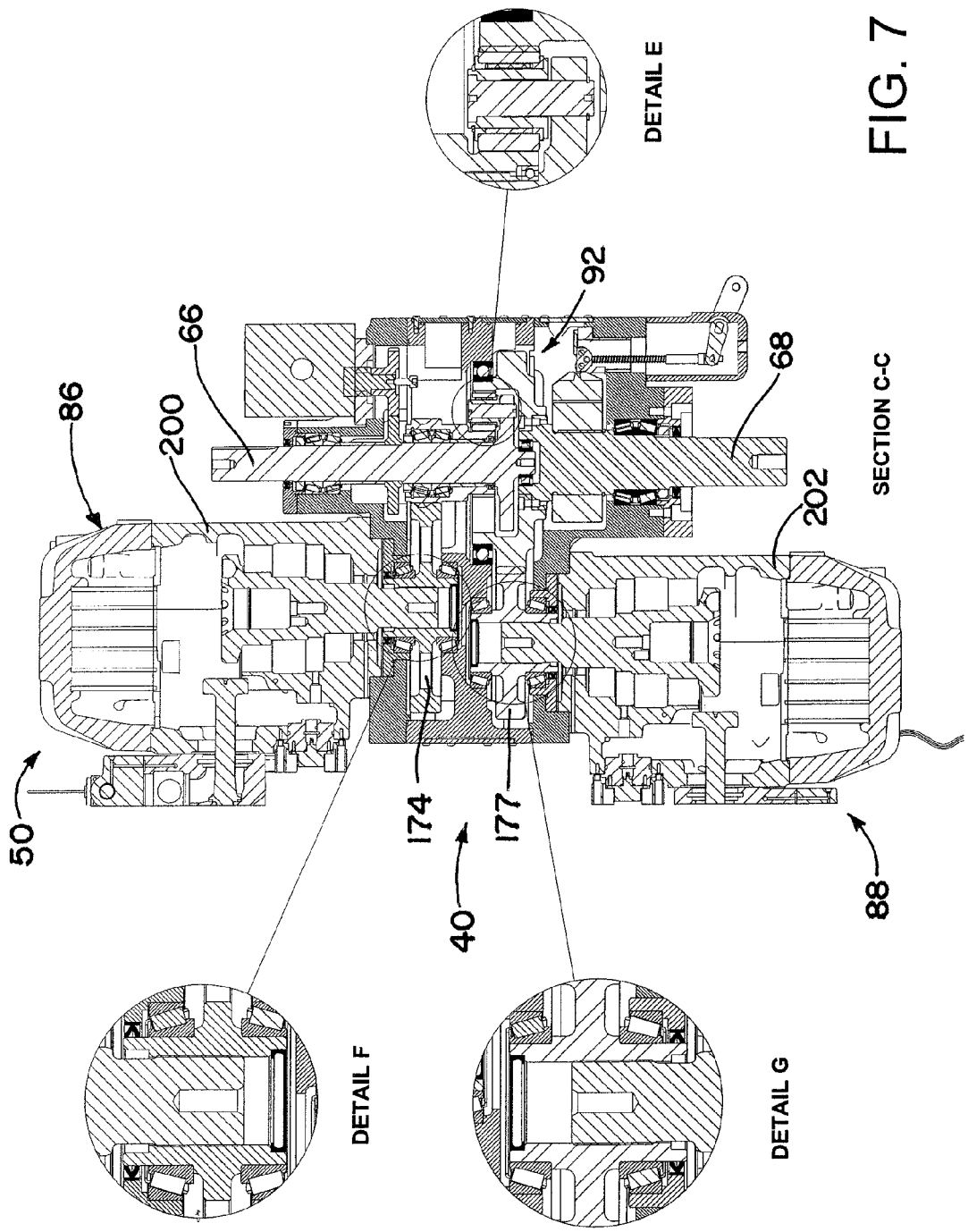
FIG. 7 is an exploded view of the portion of the powersplit transmission shown in FIG. 4.

The hydraulic pump receiving section 170 includes the opening 138 in the main housing 70 through which a portion of the first hydraulic unit 86 (FIG. 2), generally acting as a pump, is received. A toothed pinion 174 is located in the hydraulic pump receiving section 170 and is supported for rotation relative to the main housing 70 by at least one bearing 176. The illustrated embodiment includes two tapered roller bearings 176. The tooth pinion 174 includes a splined central passage 178 having an axis which passes through a center of the opening 138 in the main housing 70. The splined central passage 178 is adapted to receive an input shaft of the first hydraulic unit 86, as illustrated in FIG. 7. The tooth pinion 174 is adapted to rotate with the sun gear 98 of the planetary gear train 92. When the first hydraulic unit 86 (FIG. 2) is received in the hydraulic pump receiving section 170, rotation of the tooth pinion 174 results in rotation of the input shaft of the first hydraulic unit 86 (FIG. 2).

The hydraulic motor receiving section 172 includes the opening 148 in the main housing 70 through which a portion of the second hydraulic unit 88 (FIG. 2), generally acting as a hydraulic motor, is received. A toothed pinion 177 is located in the hydraulic motor receiving section 172 and is supported for rotation relative to the main housing 70 by at least one bearing 179. In this embodiment, FIG. 6 illustrates two tapered roller bearings 179. The tooth pinion 177 includes a splined central passage 180 having an axis which passes through a center of the opening 148 in the main housing 70. The tooth pinion 177 of the hydraulic motor receiving section 172 engages and rotates with rotation of the ring gear 100 of the planetary gear train 92. FIG. 6 illustrates the axis of the central passage 178 of the tooth pinion 174 of the hydraulic pump receiving section 170 as being spaced radially away from the axis of the central passage 180 of the tooth pinion 177 of the hydraulic motor receiving section 172. Alternatively, the axis of the central passage 178 of the tooth pinion 174 of the hydraulic pump receiving section 170 may be coaxial with the axis of the central passage 180 of the tooth pinion 177 of the hydraulic motor receiving section 172. To make this change, the sizes of the respective gears would need to be adjusted. As the axes of the tooth pinions are spaced radially from one another (i.e., are not coaxial) as viewed in FIG. 6, the center of the opening 148 of the hydraulic motor receiving section 172 is spaced radially from the center of the opening 138 of the hydraulic pump receiving section 170. In an embodiment with coaxial axes of the tooth pinions 174 and 177, the center of the opening 148 of the hydraulic motor receiving section 172 and the center of the opening 138 of the hydraulic pump receiving section 170 will be coaxial. In any case, the axes of the central passages 178 and 180 are offset to the same side of the input and output shafts 66 and 68 (FIG. 2).

FIG. 6 also illustrates a forced lubrication pump, schematically illustrated at reference numeral 182, which is driven by the input shaft 66 through a series of gears (none of which is illustrated in FIG. 2). The forced lubrication pump 182 operates to pull hydraulic fluid out of the main housing 70, when the main housing 70 includes a wet sump, and to circulate the hydraulic fluid through a filter before providing the hydraulic fluid back to the main housing for lubricating moving parts located in the main housing. The hydraulic fluid may be directed through a heat exchanger (not shown) or other cooling mechanism before providing the hydraulic fluid back to the main housing. In an alternative embodiment, the main housing 70 includes a dry sump with the forced lubrication pump 182 adapted to spray fluid into the main housing at locations to be lubricated and to suction fluid out of the main housing for providing the fluid back to a separate, external reservoir. In still another embodiment, the forced lubrication pump 182 may be eliminated and splash lubrication used to lubrication moving parts in the main housing 70.

The powersplit transmission 50 also may include a parking brake (not shown) located on a second end 183 of the output shaft 68. The parking brake may be any known type of parking brake, such as a drum brake. For example, the parking brake may include a section that is adapted to rotate with the output shaft 68 and a section that is fixed to the end of the housing 70. Actuation of the parking brake engages the two sections to prevent rotation of the output shaft 68.

The illustrated power split transmission 50 includes another parking brake mechanism 190. The second parking brake mechanism 190 includes a gear 192 that is fixed for rotation to the output shaft 68 and is located within the main housing 70. An outer periphery of the gear 192 includes a plurality of axially extending teeth (spur gear teeth). A parking pawl 194 is adapted to move into and out of engagement with the teeth of the gear 192. The parking pawl 194 includes an elongated locking mechanism 196 that is attached to a rotatable arm portion 198. The rotatable arm portion 198 is biased, such as by a spring (not shown), to maintain the locking mechanism 196 out of engagement with the teeth of the gear 192. The rotatable arm portion 198 is adapted to be connected to a cable that may be actuated by a foot pedal or a hand mechanism for rotating the rotatable arm portion and moving the locking mechanism 196 into engagement with the gear 192. Alternatively, electrical or hydraulic actuation means may be provided for rotating the rotatable arm portion 198. When in engagement with a tooth of gear 192, the locking mechanism 196 of the parking pawl 194 prevents rotation of the gear 192 and thus, prevents rotation of the output shaft 68.

FIG. 7 illustrates the powersplit transmission of FIG. 6 with the addition of the first and second hydraulic units 86 and 88 fixedly attached to the main housing 70. As illustrated in FIG. 7, the first hydraulic unit 86 includes a housing 200 having a portion that is received in the opening 138 (FIG. 6) of the hydraulic pump receiving section 170 (FIG. 6) of the main housing 70 and is fixedly attached to the main housing. When attached to the main housing 70, the housing 200 of the first hydraulic unit 86 is sealed against the main housing 70 by known sealing means. Likewise, the second hydraulic unit 88 includes a housing 202 having a portion that is received in the opening 148 (FIG. 6) to the hydraulic motor receiving section 172 (FIG. 6) of the main housing 70 and is fixedly attached to the main housing on an opposite side of the main housing from the first hydraulic unit 86. When attached to the main housing 70, the housing 202 of the second hydraulic unit 88 is sealed against the main housing by known sealing means.

The first and second hydraulic units 86 and 88 illustrated in FIG. 7 are bent axis piston pumps. Those skilled in the art should recognize that other forms of pumps and motors may be used with the present invention. FIG. 6 further illustrates the pump shaft of the first hydraulic unit 86 fixed for rotation in the tooth pinion 174 of the hydraulic pump receiving section 170 (FIG. 6). Similarly, the motor shaft of the second hydraulic unit 88 is fixed for rotation in the tooth pinion 177 of the hydraulic motor receiving section 172 (FIG. 6). The first and second hydraulic units 86 and 88 may have bearings for supporting their respective shafts or, alternatively, the bearings supporting the associated tooth pinions 174 and 177 may further act to supports for the shafts of the first and second hydraulic units 86 and 88. Additionally, the first and second hydraulic units 86 and 88 may share a shaft seal with the tooth pinions 174 and 177 of the planetary gear train 92.

In the embodiment illustrated in FIG. 7, the gears of the planetary gear train 92 are spur gears. In an alternative embodiment, one or more of the gears may be helical gears instead of spur gears. By using spurs gears, or alternatively helical gears, the first hydraulic unit 86 and the second hydraulic unit 88 are located in an end-to-end manner, such that the yoke of the first hydraulic unit is located opposite of the first hydraulic unit shaft and the second hydraulic unit shaft from the yoke of the hydraulic motor. In yet another embodiment, not illustrated, the ring gear and the portion of the sun gear to which the toothed pinion 174 engages may be beveled gears. Likewise, the tooth pinions 174 and 177 may be beveled gears. As a result, the first and second hydraulic units 86 and 88 would be oriented in a direction with their shafts orthogonal to the input shaft 66 and output shaft 68. This arrangement may be beneficial for packaging the powersplit transmission 50 in a vehicle.

Figure 8:
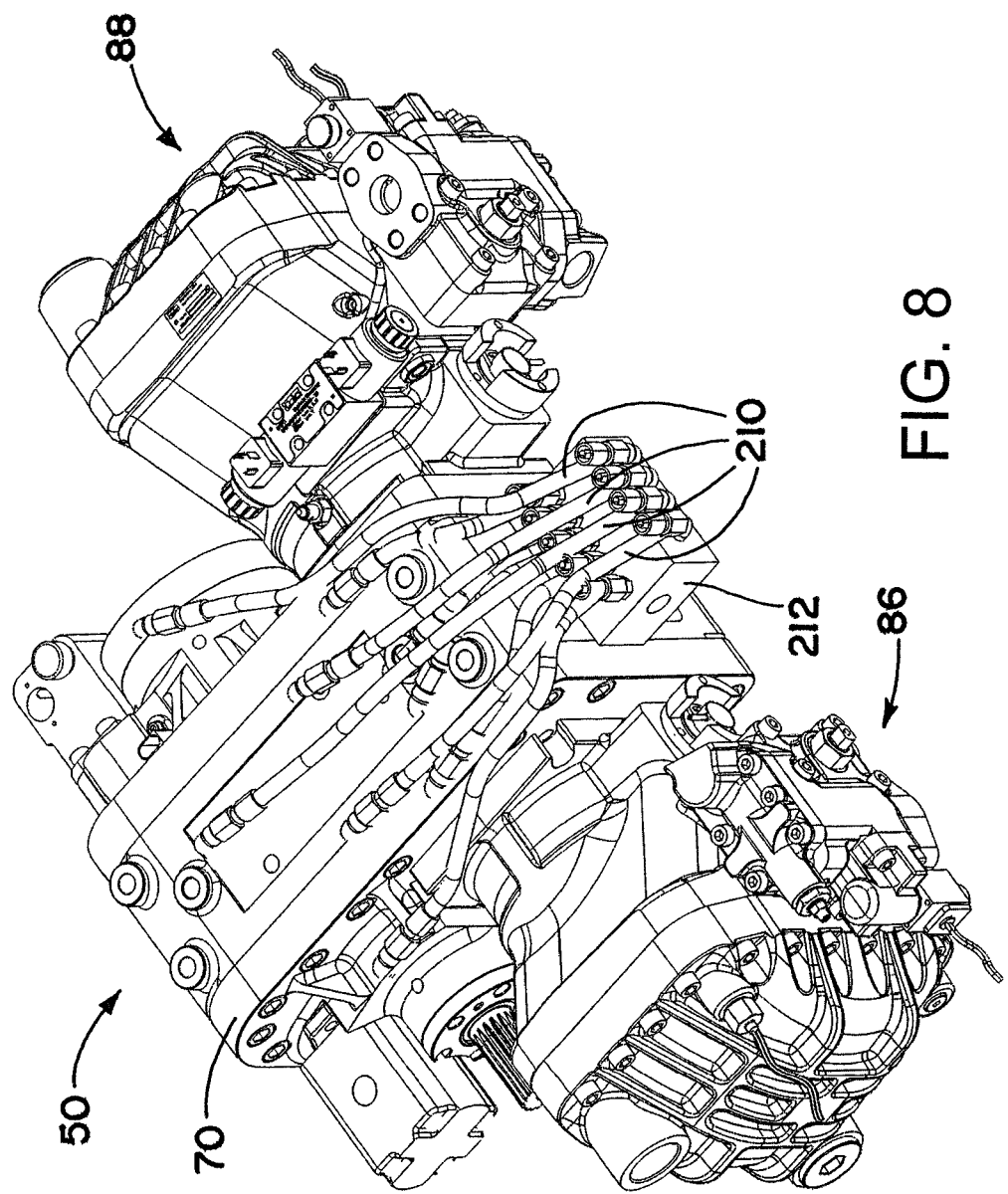
FIG. 8 is a perspective view of another exemplary powersplit transmission provided in accordance with the present invention.

FIG. 8 is a perspective view of the powersplit transmission 50 with hydraulic conduits 210 and a hydraulic manifold 212 attached to the main housing 70. The hydraulic conduits 210 and the hydraulic manifold 212 direct fluid flow between the forced lubrication pump 182 and portions of the powersplit transmission 50 requiring lubrication. Instead of using separate hydraulic conduits 210 and the hydraulic manifold 212 as shown in FIG. 8, the hydraulic manifold and conduits may be formed integral with the main housing 70. Additionally, hydraulic conduits extending between the first and second hydraulic units 86 and 88 may be formed integral with the main housing 70. Although not illustrated in FIG. 2 or 8, the hydraulic circuit 114 (FIG. 2) may further include filtration components for filtering contamination and debris from the hydraulic fluid and a heat exchanger for cooling the hydraulic fluid.

Figure 9:
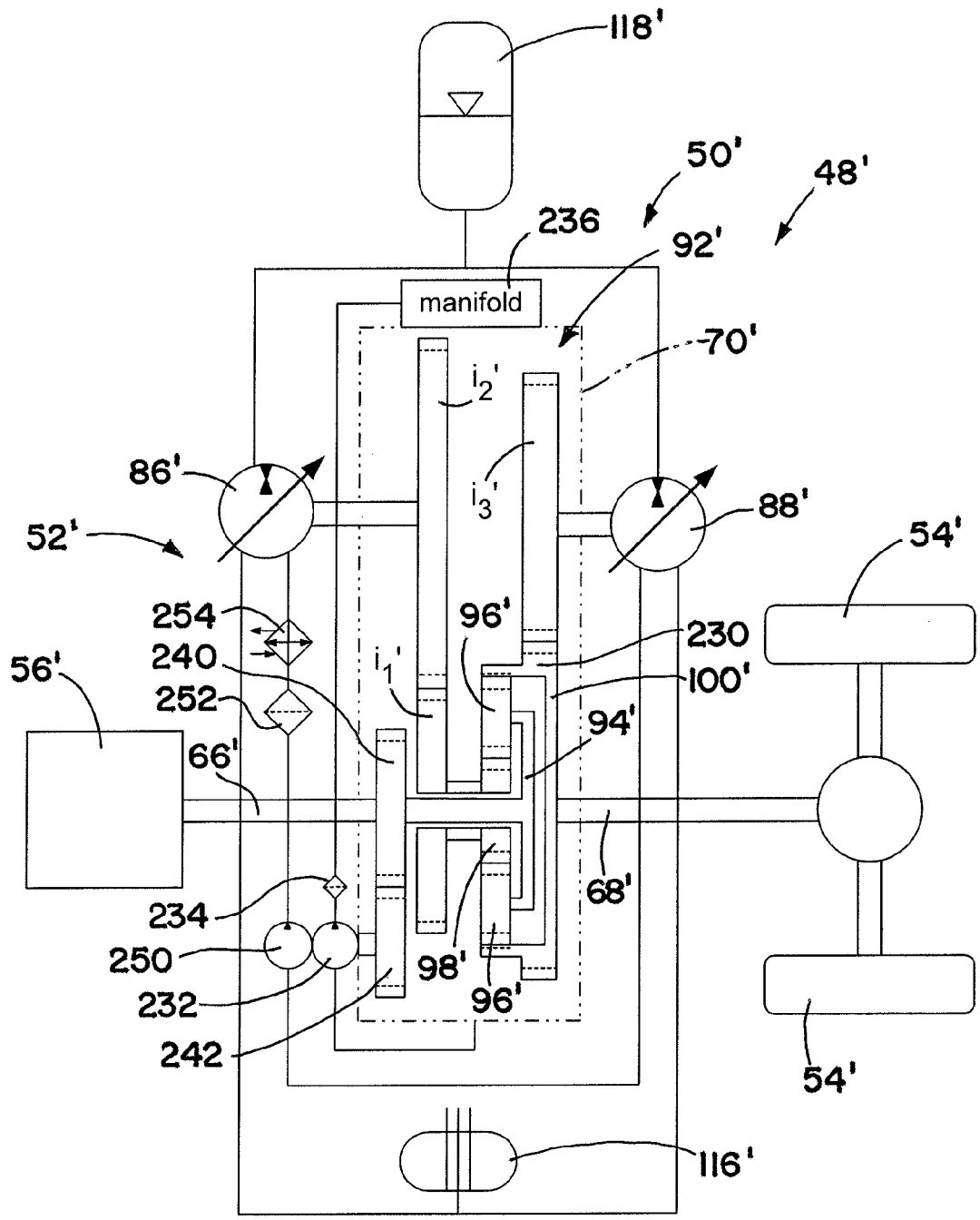
FIG. 9 is a schematic representation of another exemplary system including a powersplit transmission in accordance with the present invention.

FIG. 9 illustrates an alternative embodiment of a system 48' constructed in accordance with the present invention. Structures of FIG. 9 that are the same as or similar to those described above with reference to FIG. 2 are labeled with the same reference numeral as used in FIG. 2 with the addition of an apostrophe (').

As FIG. 9 illustrates, the ring gear 100' of the powersplit transmission 50' has been slightly modified to include an outer spur gear portion 230. Spur gear i3' is in direct engagement with this outer spur gear portion 230 of the ring gear 72'. This design eliminates the spur gear i4 of FIG. 2. FIG. 9 also illustrates a forced lubrication pump 232 that is similar to the forced lubrication pump 182 (FIG. 6), which was described previously but not illustrated in FIG. 2. Forced lubrication pump 232 removes fluid from a within the main housing 70', directs the fluid through a filter 234 and directs the fluid to a manifold 236 from which it is directed back into the main housing 70' for lubricating moving parts. The forced lubrication pump 232 is driven by the input shaft 66' via spur gears 240 and 242. FIG. 9 further includes a cooling pump 250 that is driven off of a common shaft as the forced lubrication pump 232. The cooling pump 250 directs fluid through a filter 252 and a heat exchanger 254 prior to entering the first hydraulic unit 86'.

Figure 10:
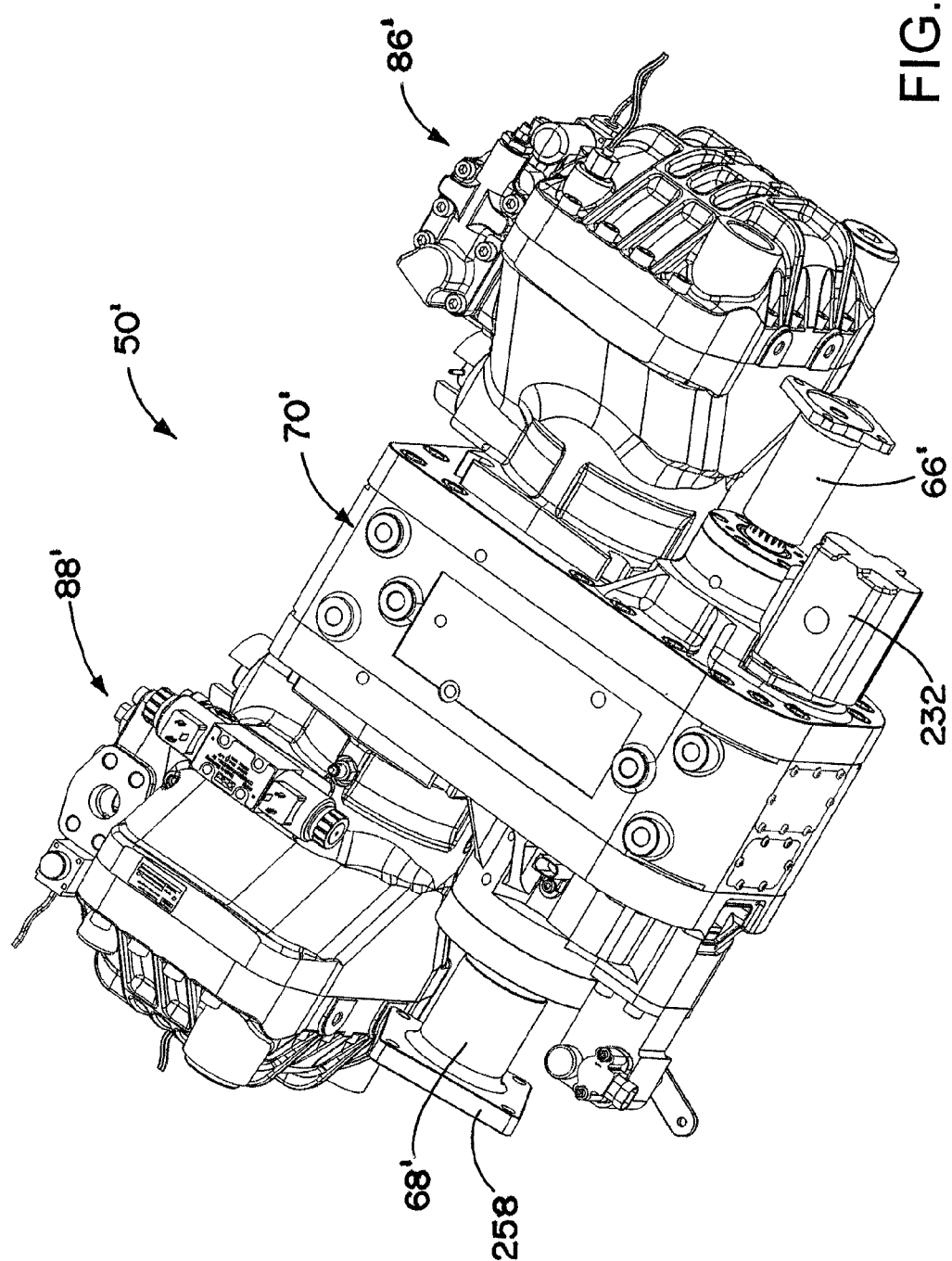
FIG. 10 is a perspective view of another powersplit transmission provided in accordance with the invention.

FIG. 10 is a perspective view of the powersplit transmission 50' of FIG. 9. FIG. 10 illustrates the forced lubrication pump 232, to which the cooling pump 234 (FIG. 9) would be connected, located on a same side of the main housing 70' as the first hydraulic unit 86'. Additionally, the output shaft 68' includes a flanged portion 258 for connection to a drive shaft.

Figure 11:
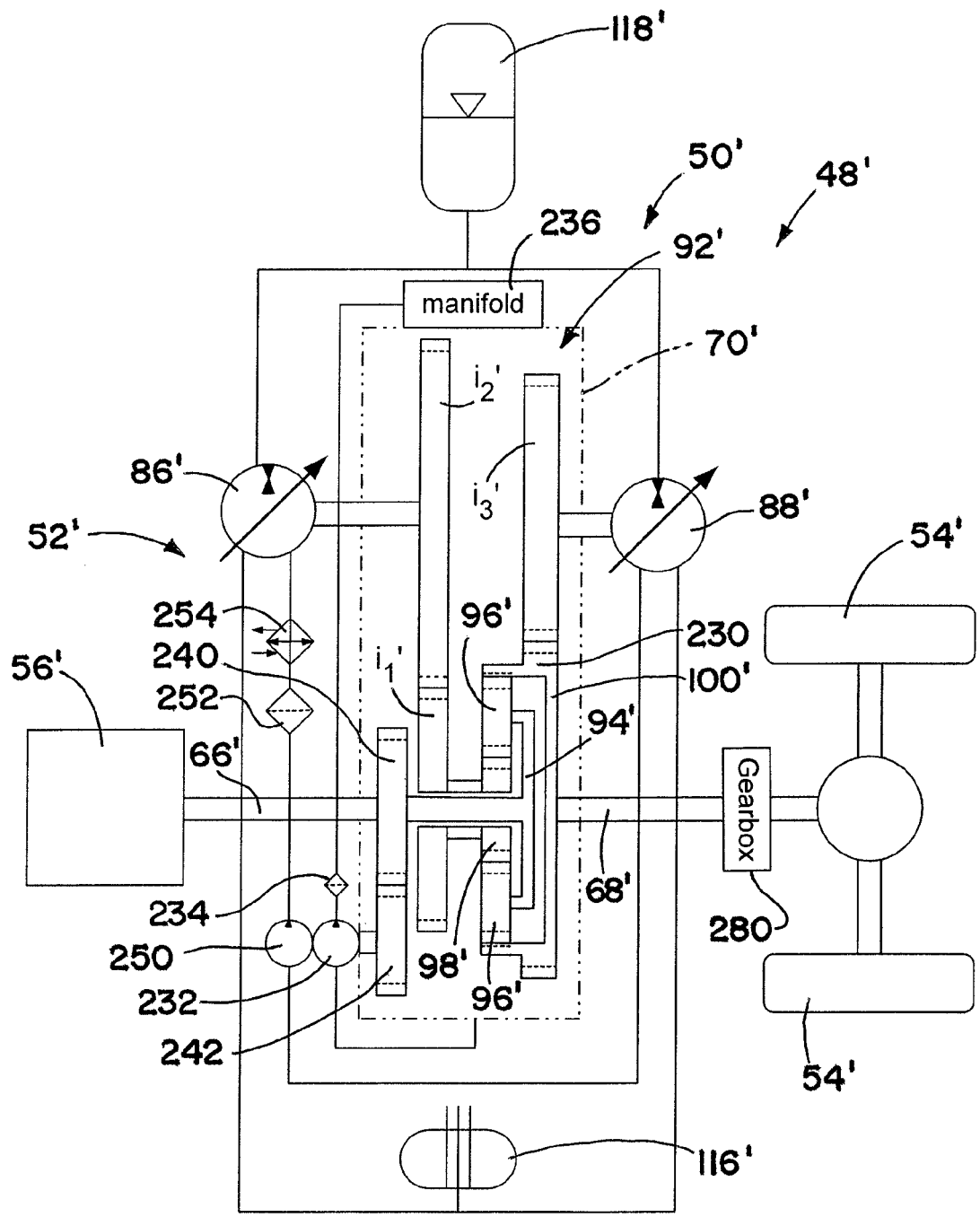
FIG. 11 is a schematic representation of another exemplary system including a powersplit transmission in accordance with the present invention.

FIG. 11 is a schematic illustration of yet another embodiment of a system constructed in accordance with the present invention. The powersplit transmission of FIG. 11 is identical to that illustrated with reference to FIG. 9 with the addition of a multiple speed gearbox 280, which may be mounted directly to the housing 70' or may be mounted a spaced distance away from the housing 70'. Alternatively, the housing 70' may be modified to house the multiple speed gearbox 280. For ease of illustration, structures of the system of FIG. 11 that are the same as or similar to those illustrated in FIG. 9 are illustrated with the same reference numerals as used in FIG. 9. The multiple speed gearbox 280 may be any type of multiple speed gearbox, such as a two speed gearbox. The multiple speed gearbox 280 may be designed for enabling higher torques at low input speeds and higher fuel efficiencies at high input speeds.

In summary, the present invention provides a powersplit transmission having a compact configuration that readily can be incorporated in a vehicle, particularly within the vehicle frame. The powersplit transmission includes (a) a mechanical transmission having a rotatable input shaft, a rotatable output shaft, and multiple gears for mechanically transmitting power between the input shaft and the output shaft; and (b) a hydraulic transmission containing a fluid for transmitting power between the input shaft and the output shaft. The mechanical transmission has a housing from which the input shaft and the output shaft extend. The hydraulic transmission includes first and second hydraulic units, each of which can function as a pump or a motor. The first hydraulic unit is coupled to the mechanical transmission system and the second hydraulic unit is coupled to the output shaft. The first and second hydraulic units are offset to the same side of the input shaft and the output shaft.

Although the principles, embodiments, and operation of the present invention have been described in detail herein, this is not to be construed as being limited to the particular illustrative forms disclosed. It will thus become apparent to those skilled in the art that various modifications of the embodiments herein can be made without departing from the scope of the invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A powersplit transmission comprising:
   a mechanical transmission having a rotatable input shaft, a rotatable output shaft, and multiple gears for mechanically transmitting power between the input shaft and the output shaft, the mechanical transmission having a housing from which the input shaft and the output shaft extend;
   a hydraulic transmission containing a fluid for transmitting power between the input shaft and the output shaft, the hydraulic transmission including first and second hydraulic units, each of which can function as a pump or a motor, the first hydraulic unit being coupled to the mechanical transmission system and the second hydraulic unit being coupled to the output shaft; and
   where the first and second hydraulic units are offset to the same side of the input shaft and the output shaft.

2. The powersplit transmission of claim 1, where the mechanical transmission includes a planetary gear train having a sun gear, a ring gear, a plurality of planet gears, and a carrier associated with the planet gear;
   the input shaft is operatively connected to the carrier for inputting motion to the planet gears, and the output shaft is operatively connected to the ring gear, the first hydraulic unit being operatively connected to the sun gear of the planetary gear train and the second hydraulic unit being operatively connected to the output shaft.

3. The powersplit transmission of claim 1, where the output shaft is coaxial with the input shaft.

4. The powersplit transmission of claim 1, where the first and second hydraulic units are located on opposite sides of the housing.

5. The powersplit transmission of claim 1, where the first and second hydraulic units each have associated shafts, and the first and second hydraulic units are mounted on the housing such that the shafts are coaxial with one another.

6. The powersplit transmission of claim 1, where the first and second hydraulic units each have associated shafts, and the first and second hydraulic units are mounted on the housing such that the shafts are parallel to one another but offset relative to a centerline of the input and output shafts.

7. The powersplit transmission of claim 1, further including a parking pawl that is configured to engage at least one gear to prevent rotation of the at least one gear and, thus, rotation of the output shaft.

8. The powersplit transmission of claim 1, further including a forced lubrication pump for drawing fluid from the housing and proving the fluid to bearings in the housing, the forced lubrication pump being driven by one of the input and output shafts.

9. A powersplit transmission comprising:
   a mechanical transmission having a rotatable input shaft, a rotatable output shaft, and multiple gears for mechanically transmitting power between the input shaft and the output shaft, the mechanical transmission having a housing from which the input shaft and the output shaft extend;
   a hydraulic transmission containing a fluid for transmitting power between the input shaft and the output shaft, the hydraulic transmission including first and second hydraulic units, each of which can function as a pump or a motor, the first hydraulic unit being coupled to the mechanical transmission system and the second hydraulic unit being coupled to the output shaft; and
   where the first and second hydraulic units are offset to the same side of the input shaft and the output shaft;
   a forced lubrication pump for drawing fluid from the housing and proving the fluid to bearings in the housing, the forced lubrication pump being driven by one of the input and output shafts; and
   a cooling pump for drawing fluid from the housing and providing the fluid to a heat exchanger, the cooling pump being driven by a common shaft as the forced lubrication pump.

10. The powersplit transmission of claim 1, further including a multiple speed gearbox attached to the output shaft.

11. A system for a vehicle having the powersplit transmission of claim 1, and further including a high pressure accumulator in fluid communication with the first and second hydraulic units, in a first mode of operation the second hydraulic unit receiving fluid from the accumulator and operating as a motor to output power for propelling the vehicle, and in a second mode of operation the second hydraulic unit operating as a pump to pump fluid to the accumulator.

12. A vehicle including a system having a powersplit transmission;
   the powersplit transmission comprising:
      a mechanical transmission having a rotatable input shaft, a rotatable output shaft, and multiple gears for mechanically transmitting power between the input shaft and the output shaft, the mechanical transmission having a housing from which the input shaft and the output shaft extend;

a hydraulic transmission containing a fluid for transmitting power between the input shaft and the output shaft, the hydraulic transmission including first and second hydraulic units, each of which can function as a pump or a motor, the first hydraulic unit being coupled to the mechanical transmission system and the second hydraulic unit being coupled to the output shaft; and where the first and second hydraulic units are offset to the same side of the input shaft and the output shaft; and the system further including a high pressure accumulator in fluid communication with the first and second hydraulic units, in a first mode of operation the second hydraulic unit receiving fluid from the accumulator and operating as a motor to output power for propelling the vehicle, and in a second mode of operation the second hydraulic unit operating as a pump to pump fluid to the accumulator;

a power source coupled to the input shaft to drive rotation of the input shaft and deliver power to the powersplit transmission, and a power consumer coupled to the output shaft to receive power from the powersplit transmission.

13. A vehicle as set forth in claim 12, where the vehicle includes a frame and the powersplit transmission is sized to fit within the frame.

* * * * *